United States Patent [19]

Harris

[11] 3,924,472

[45] Dec. 9, 1975

[54] MEASURING DEVICE

[76] Inventor: Janet E. Harris, P.O. Box 2819, West Palm Beach, Fla. 33402

[22] Filed: May 28, 1974

[21] Appl. No.: 474,134

[52] U.S. Cl. .................................................. 73/426
[51] Int. Cl.² ......................................... G01F 19/00
[58] Field of Search .......... 73/426; 222/173, 179.5, 222/180

[56] References Cited
UNITED STATES PATENTS

| | | | |
|---|---|---|---|
| 692,697 | 2/1902 | Nance | 222/180 |
| 1,893,139 | 1/1933 | Gessler | 222/173 |
| 3,108,719 | 10/1963 | Bartoo | 222/180 |

Primary Examiner—James J. Gill
Assistant Examiner—Anthony V. Ciarlante
Attorney, Agent, or Firm—Jack N. McCarthy

[57] ABSTRACT

This invention relates to a measuring, mixing, sifting, and/or shaking device having means thereon for mounting to a vertical-type flat surface. The device includes a measuring container, having attachable thereto perforated and unperforated covers. The device is capable of being mounted to a vertical-type surface at any desired elevation for ease of reading, such as at eye-level and is also capable of being used unmounted in a manner such as a conventional measuring container.

3 Claims, 11 Drawing Figures

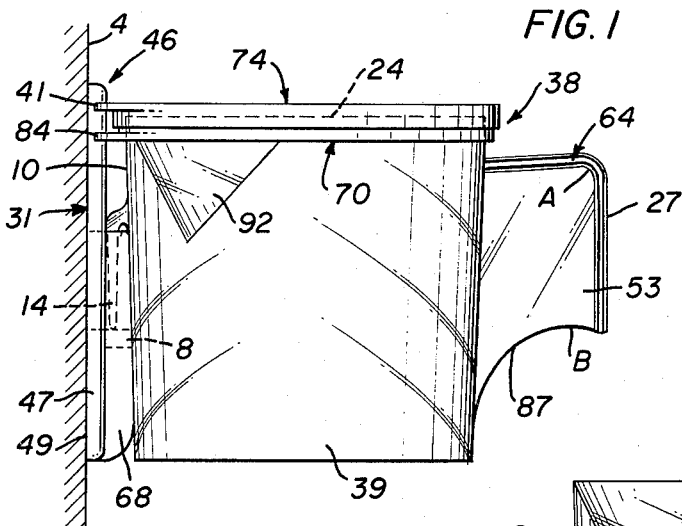
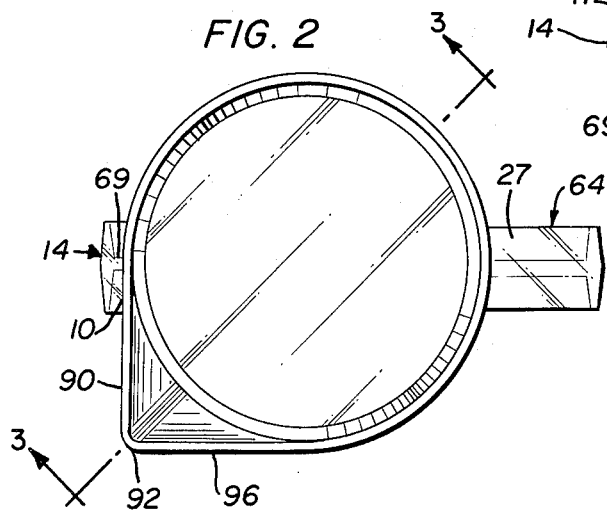
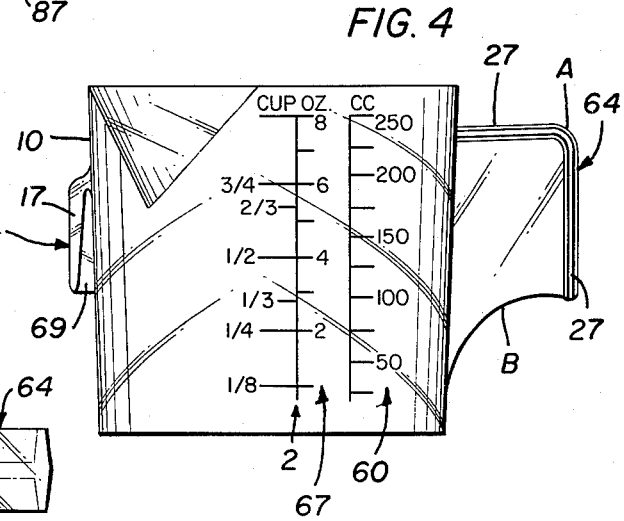
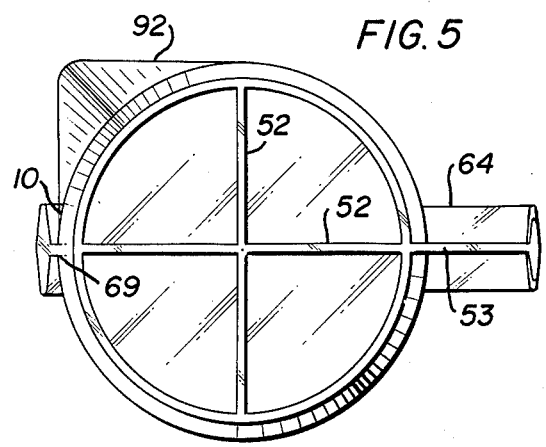
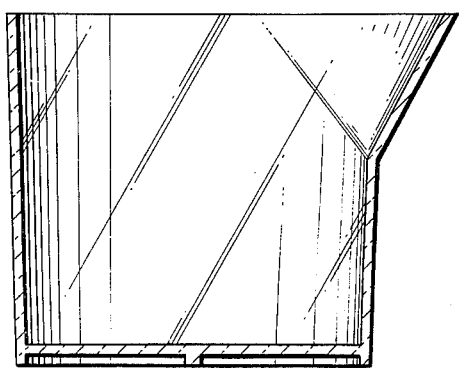

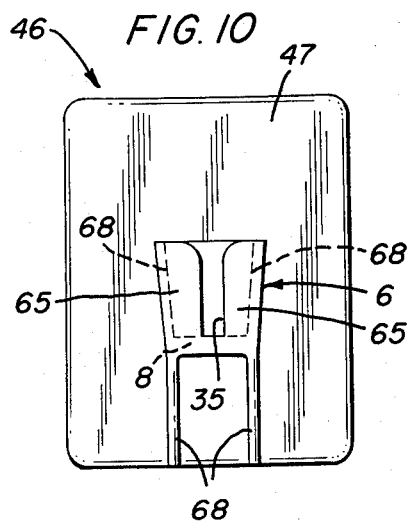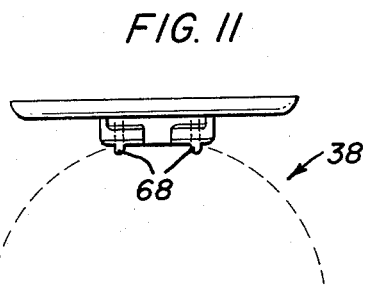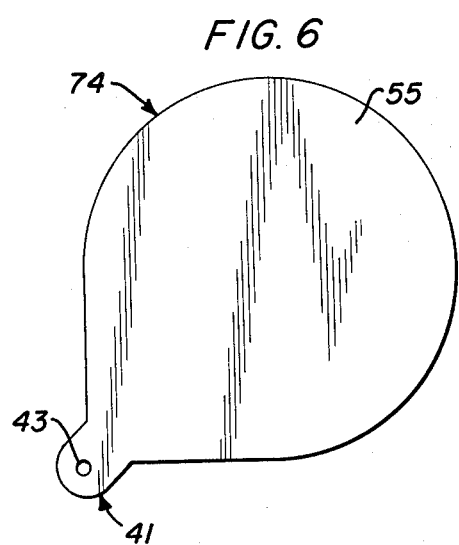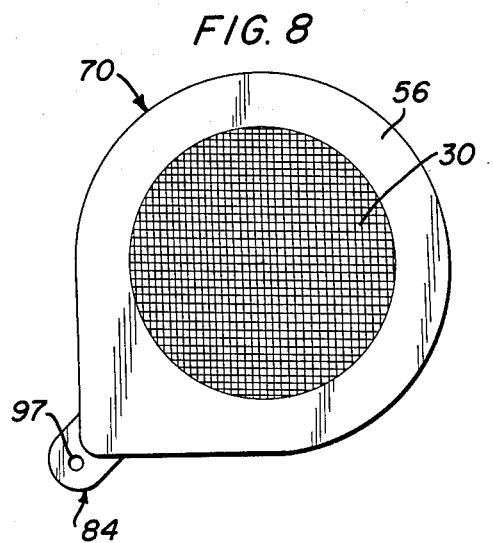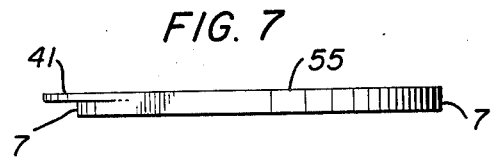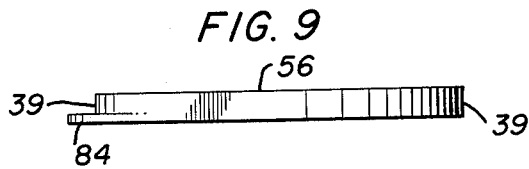

MEASURING DEVICE

BACKGROUND OF THE INVENTION

1. Field of the invention

This invention relates generally to improvements in measuring devices, and more particularly, but not by way of limitation, to a measuring, mixing, sifting, and/or shaking device capable of being mounted to a vertical-type flat surface.

2. Description of the prior art

It is well known that the use of conventional measuring cups or the like can quite often result in inaccuracies due to normal container movement if the container is raised by hand for ease of viewing or such inaccuracies can occur if the container is sitting on a table, counter, or the like, due to errors in the line of sight. Furthermore, it is often that conventional measuring devices are used for mixing liquids, semi-liquids, solids or other materials and on numerous occasions spillage of the ingredients occurs as a result of improper holding or movement of the measuring device or of the means used with the measuring device for stirring or mixing. It is also known that much time can be wasted in transferring ingredients from measuring devices to mixing, sifting, and/or shaking devices for those functions.

Other efforts have been made to improve measuring devices wherein spillage can be eliminated and time saved but to the best of my knowledge, no practical measuring device has been previously provided which permits the measurement of the ingredients at an elevated level relative to the table, counter, or the like, and which is also capable of being used as a mixer, sifter, and/or shaker. A prior art patent involving an elevated mixing device is U.S. Pat. No. 2,556,782, Elevated Ingredient Dispenser Having a Rotary Bottom Discharge Valve by Melissa M. Venters.

SUMMARY OF THE INVENTION

This invention involves a measuring device capable of being mounted to a vertical-type flat surface which can also be used as a mixer, sifter, and/or shaker. The device is basically comprised of a measuring container having thereon attaching means which mates with an external type wall mount and which has attachable to said container perforated and unperforated covers for containing or dispensing the contents of said measuring device.

It is a significant object of my invention to provide an improved measuring device by which a more accurate measurement can be obtained.

Another important object of this invention is to provide a measuring device which can also be used as a mixer, sifter, and/or shaker, which shall be inexpensive in construction, simple, effective in operation, and adaptable to many other uses.

Another object of this invention is to provide a measuring device wherein the use of the measuring device itself as a mixer, sifter, and/or shaker will eliminate the time consuming steps of changing (and subsequent cleaning) to separate mixing, sifting, and/or shaking containers. Elimination of such unnecessary changing by this invention will also help to prevent spillage.

A further object of this invention is to provide a measuring device which is easily detachable from a vertical-type flat surface for emptying or dispensing the contents of said container.

Another object of this invention is to provide a common household measuring device which will assist the common housewife or cook in learning the metric system by simply having thereon a visual comparison of the normal scales relative to a corresponding metric scale.

Another and final object of this invention is not only to provide a measuring device which can be attached to a vertical-type flat surface such as a wall, cabinet, or appliance when in use but also attachment to same for storing when not in use, thereby leaving the kitchen counters, work tables, and shelves in an uncluttered condition.

Other objects and advantages of the invention will be evident from the following detailed description when read in conjunction with the accompanying drawings which illustrate the invention.

BRIEF DESCRIPTION OF THE DRAWINGS

FIG. 1 is a side elevational view of the invention with its perforated and unperforated covers as it appears in its mounted position to a vertical-type flat surface.

FIG. 2 is a top plan view of the invention.

FIG. 3 is a sectional view as taken along lines 3—3 of FIG. 2.

FIG. 4 is a side elevational view of the measuring container showing the scales.

FIG. 5 is a bottom plan view of the invention.

FIG. 6 is a top plan view of the unperforated cover.

FIG. 7 is a side elevational view of the unperforated cover.

FIG. 8 is a top plan view of the perforated cover.

FIG. 9 is a side elevational view of the perforated cover.

FIG. 10 is a front elevational view of the mounting bracket.

FIG. 11 is a top plan view of the mounting bracket.

DESCRIPTION OF THE PREFERRED EMBODIMENTS

Referring to the drawings in detail, and in particularly to FIG. 1, a measuring device 38 is shown with a removable perforated cover 70 and removable unperforated cover 74 which has been attached to a vertical-type flat surface 4 by a mounting bracket 46 and cooperating fastening means 14 on the device 38. Measuring device 38 basically comprises, in the present instance, a transparent or translucent measuring cup 39 preferably having handle 64 mounted on one side thereof, with a pounng spout or lip 92 adjacent to fastening means 14 which is positioned on the other side of said cup 39 approximately diametrically opposite handle 64 with suitable spaced between handle 64 and pouring spout or lip 92 for placement of the desired graduated scales (see FIG. 4).

It will be understood that measuring device 38, mounting bracket 46, and covers 70 and 74 may be formed of any desired material, such as sheet metal, aluminum, special glasses or plastics. However, it is suggested that a transparent or translucent material be used instead of opaque for ease of reading the graduated scales against the container's contents. It may also be noted that covers 70 and 74 may also be formed of material not unlike that of measuring device 38 but will usually be formed of flexible material normally used for lids or covers of this type. Mounting bracket 46 may also be of any suitable material capable of being fastened to a vertical-type flat surface by such means as glues, adhesives, or other mechanical fasteners such as screws or nails. The cup 39 of measuring device 38 may be of any capacity but for practical household purposes, it will normally have a volume between 250 and 500 cubic centimeters or milliliters.

In referring to FIGS. 2,3,4,5, and 10, male-type fastening means 14 consists of a rectangular-type flange means 17 which has been extended outwardly and downwardly from an external side 10 of said cup 39 of measuring device 38, having tapered sides downwardly as shown in FIG. 4. In the center of said fastening means 14 and running its length downwardly, is a web-like support means 69 which also is the corresponding guide means for slot 35 of FIG. 10 to be hereinafter described.

Handle means 64, also an integral part of cup 39 of said measuring device 38, is comprised of a rectangular-type flange means 27 extending outwardly from the side opposite fastening means 14, to a point A then downwardly with tapering sides. Located along the center of the entire inner surface of flange means 27 a central web-like support 53 connects flange means 27 to said measuring device 38. The lower extremity of said web-like support 53 adjoins the bottom of flange means 27 to said measuring device 38 at a point below the bottom in a concave shape at B.

Pouring spout or lip 92, as shown in FIG. 3, is an integral part of measuring device 38 and is comprised of two tapered sides 96 and 90 joined at right angles to each other which join the upper periphery of said measuring device 38 at points of tangency - one at a point diametrically opposite handle 64 and the other at 90° from said handle 64 when measured clockwise and which taper extends downwardly from said upper periphery to a point of convergence on said external side of measuring device 38.

In referring to FIGS. 3,4, and 5, ribs 52 are an integral part of the bottom of the cup 39 of measuring device 38 and intersect at right angles and extend across its diameter joining the bottom periphery of said measuring device 38 at four points with one of such points located in the same plane as the center of handle 64 as viewed in the bottom plan view FIG. 5.

Mounting bracket 46 is comprised of a rectangular piece of material 47 having on one side thereof a flat surface 49 which is capable of being fastened to a flat surface 4 as shown in FIG. 1 by means of adhesive tape but which can also be fastened to said flat surface 4 by any other suitable means such as mechanical fasteners, or various types of glues. The opposite side of mounting bracket 46 has located thereon, as an integral part, a fastening means 6 which mates with fastening means 14 as shown in FIG. 1.

Fastening means 6 is a double rib-type protrusion with two ribs 68 extending outwardly and transversing vertically from the bottom of said mounting bracket 46 to a point above said bracket's center as shown in FIG. 10. The upper portion of said fastening means 6 is formed into a partial cavity by a rib separator 8 and front wall means 65. Said wall means has a slot 35 which results in a female-type bracket means for the corresponding male-type fastening means 14 of measuring device 38 (see FIG. 1). The downwardly extending portion of flange means 17 fits into the partial cavity and the web-like support means 69 is guided in slot 35.

In referring to FIGS. 8 and 9, removable perforated cover 70 is comprised of a flat cover means 56 having an irregular shape corresponding to the upper periphery of measuring device 38. Flange means 39 extends downwardly along the outer periphery of said flat cover means 56 for holding the cover 70 to the measuring device 38. Flange means 39 can have a friction fit or any other holding means such as mechanical fastening means to prevent the cover from coming off when the device is being used. An integral tab means 84 extends outwardly from the bottom periphery of said flange means 39 in the area where said flange means 39 has a maximum radius from the center of said flat cover means 56 for removing the cover 70. Said removable perforated cover 70 has screen-type or hole-type multiple perforations 30 for permitting contents of measuring device 38 to flow therethrough when attached thereon to measuring device 38. Said tab means 84 as shown in this configuration has hole means 97 for normal storage convenience.

In referring to FIGS. 6 and 7, removable unperforated cover 74 is comprised of a flat cover means 55 having an irregular shape corresponding to the upper periphery of removable perforated cover 70. Flange means 7 extends downwardly along the outer periphery of flat cover means 55 for holding cover 74 to the cover 70. An integral tab means 41 extends outwardly from the top periphery of said flange means 7 in the area where said flange means 7 has a maximum radius from the center of said flat cover means 55. Said tab means 41 as shown in this configuration has hole means 43 for normal storage convenience.

Prior to use of the invention, as described and illustrated, it will be understood that normally the measuring device 38 with perforated and unperforated covers 74 and 70, respectively, attached thereon, will be mounted to mounting bracket 46 for storage convenience. In the actual use of this invention, perforated and unperforated covers 74 and 70, respectively, are removed from measuring device 38 by lifting tab means 41 and 84. The contents to be measured are then poured into said measuring device 38 to the selected graduated scale which can easily be read because of the elevated eye-level position of said measuring container. In the particular measuring device 38, there are three graduated scales 2, 67, and 60 which represent various scales of measurement: a cup measure and fractions thereof; a corresponding ounce scale; and a corresponding metric scale in cubic centimeters. It is not essential in carrying out my invention, that all three graduated scales 2, 67, and 60 have to be constructed as described but any one of said graduated scales or the combination thereof or any other type scale which comes under the purview of this invention can be used.

Depending upon the type contents previously measured, it will be seen that by attaching perforated cover 70, the contents in measuring device 38 can be sifted or strained through the multiple perforations 30 which may be constructed of any size or type desired. As can be easily seen, prior to the sifting, straining, mixing, shaking, or emptying steps, measuring device 38 can be easily detached from mounting bracket 46, if desired, by simply lifting the measuring device 38 in a vertical direction whereby said movement disengages fastening means 14 from mounting bracket 46. If mixing or shaking of the contents is required or is required prior to sifting or straining of same, unperforated cover 74 is attached to perforated cover 70 whereby the contents in measuring device 38 is totally enclosed and ready for mixing or shaking. Sifting or straining of the contents is accomplished by removing unperforated cover 74. The contents can be poured from said container by removing both of said covers 74 and 70. It should also be noted that should storage of the contents be desired, covers 74 and 70 may be attached and utilized as a cover for this purpose.

From the foregoing, it will be apparent that the present invention provides a measuring device which can eliminate inaccuracies of measurement due to normal container movement and errors in the line of sight. Furthermore, said measuring device is particularly suited for other uses such as a measuring container, mixer, sifter, and/or shaker. It is also apparent that said measuring device can be used as a covered storage container. It will further be apparent that the present measuring device is practical and of economical construction.

Changes may be made in the size, volume, combination and arrangement of parts or elements as heretofore set forth in the specifications and shown in the drawing without departing from the spirit and scope of the invention as defined in the following claims:

I claim:

1. A measuring container having in combination, a cup, said cup having an open top with an upper edge, a fastening means fixed to said cup for mounting said cup at a viewing level, said cup including a measuring scale and being transparent so that the level of contents in said cup can be viewed therethrough, a handle fixed to said cup diametrically opposite from said fastening means, a spout on said cup, one side of said spout having its upper edge extending substantially tangentially from the upper edge of said cup above said fastening means, the other side of said spout having its upper edge extending at approximately 90° to the one side, the other side of said spout having its upper edge extending tangentially from the upper edge of said cup, cover means for said cup including its spout.

2. A measuring container as set forth in claim 1 wherein said cover means comprises a first sifting cover for contact with the upper edge of said cup and said spout and a second solid cover for contact with said first cover.

3. A measuring container as set forth in claim 2 wherein said first sifting cover has a first tab projecting from the lower edge thereof, and the second solid cover has a second tab projecting from the upper edge thereof, said second tab being positioned above said first tab with said arrangement permitting the covers to be individually or collectively removed from the cup.

* * * * *